Patented Aug. 23, 1932

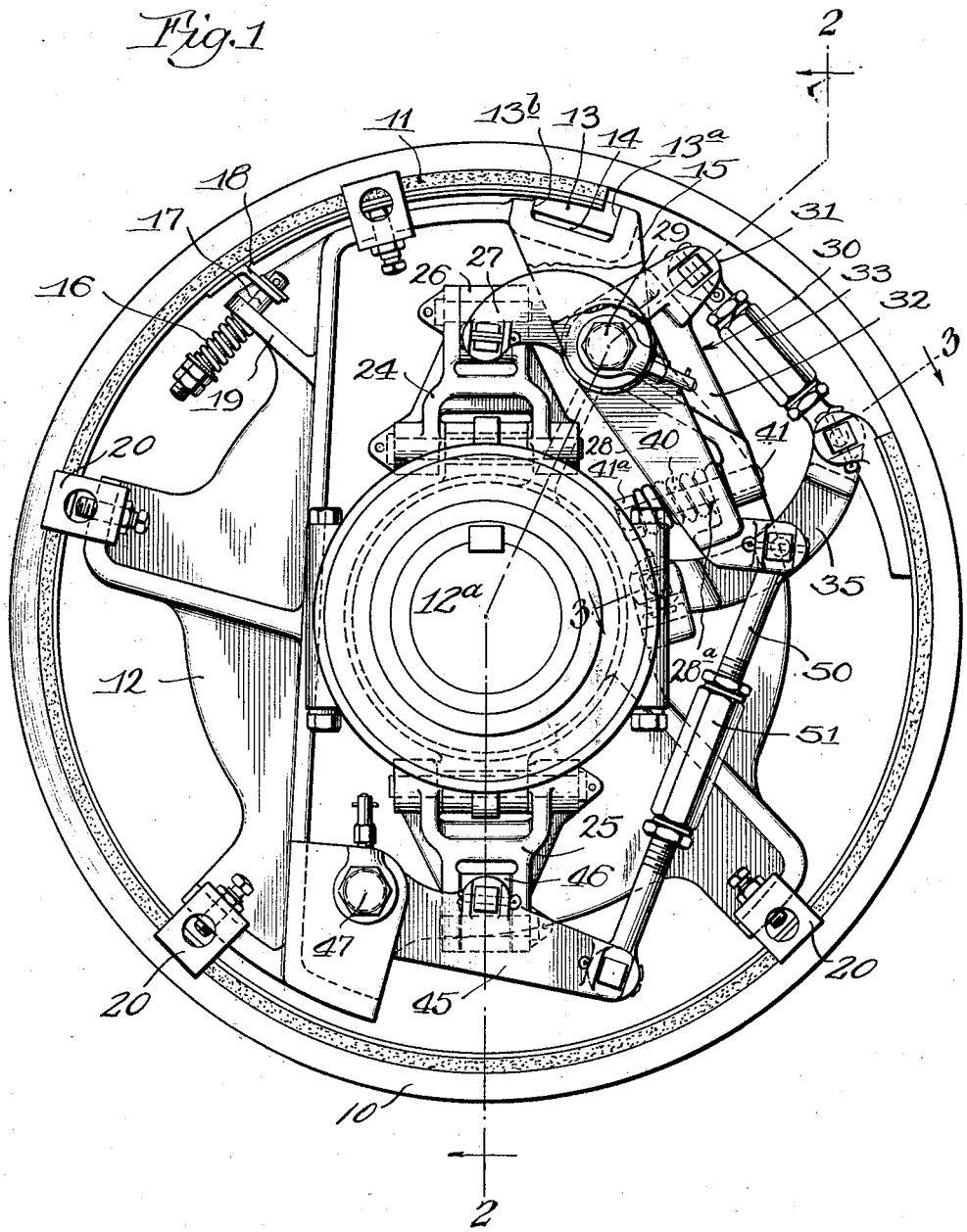

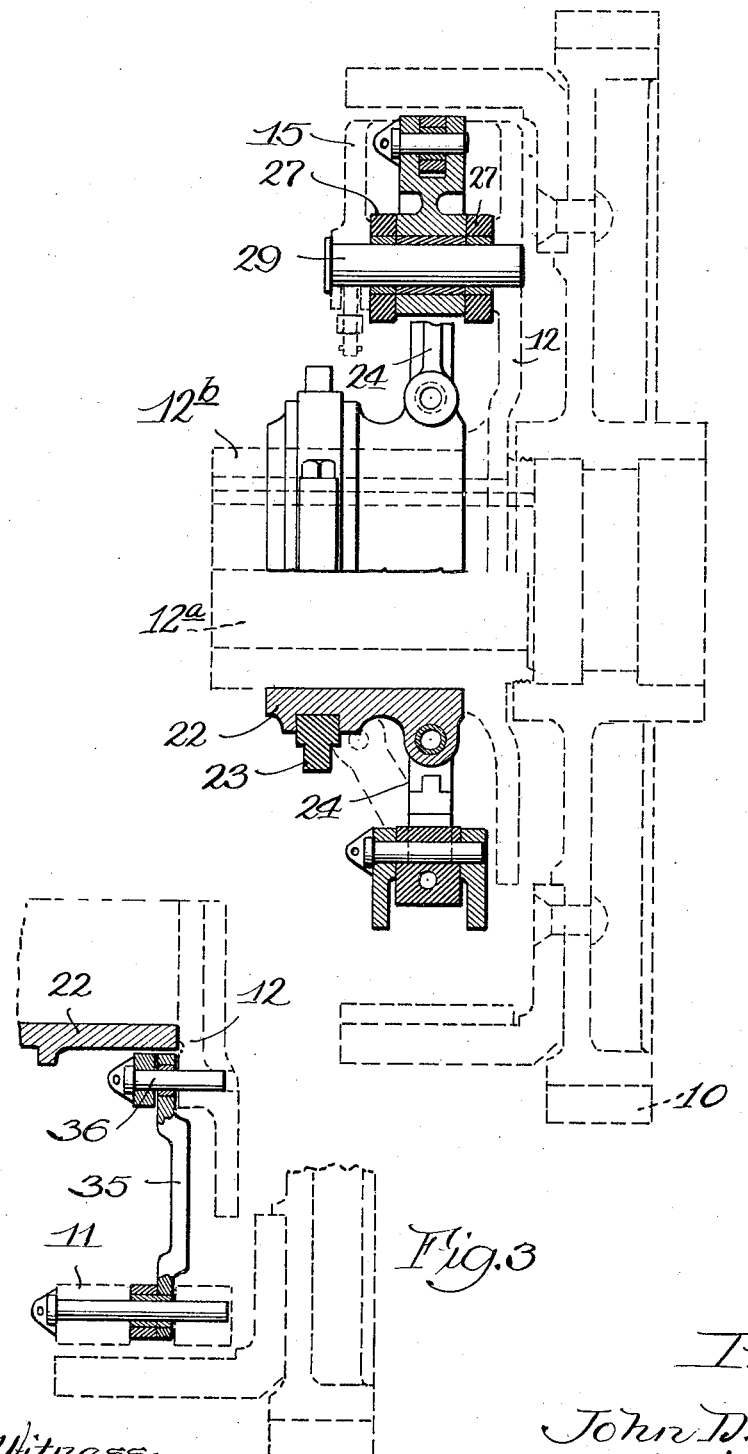

1,873,479

UNITED STATES PATENT OFFICE

JOHN D. RAUCH, OF LIMA, OHIO, ASSIGNOR TO THE OHIO POWER SHOVEL COMPANY, OF LIMA, OHIO, A CORPORATION OF OHIO

CLUTCH

Application filed April 24, 1931. Serial No. 532,402.

This invention relates to improvements in friction clutches, and has for its principal object to provide a new and improved clutch of the type described.

More specifically, my invention relates to improvements in the type of balanced or equalized toggle actuated clutch such as disclosed in United States Patent No. 866,282 issued to J. P. Karr and me on September 17, 1907, and Patent No. 1,717,892 issued to me on June 18, 1929.

The type of balanced or equalized toggle clutch above referred to is characterized by the provision of an equalizing bar which operatively connects the actuating levers at the outer ends of the toggle links with the shifting clutch collar so as to equalize the forces on opposite sides thereof, and thus eliminate friction which might otherwise be set up if all of the operating force were applied through one toggle link at one side of the shaft.

In carrying out my present invention, I utilize the balanced or equalized toggle construction above described, as applied to an internal expanding friction clutch, and also provide an improved arrangement for applying the resultant equalized clutch operating force through a suitable tension device so as to give a smoother clutching action and minimize excessive frictional pressure when the clutch is initially operated.

The invention may best be understood by reference to the accompanying drawings, in which Figure 1 is a face view of a clutch constructed in accordance with my invention.

Figure 2 is a sectional detail view taken on line 2—2 of Figure 1, with unimportant parts of the mechanism shown in dotted lines.

Figure 3 is a sectional detail view taken on line 3—3 of Figure 1.

Referring now to details of the mechanism shown in the drawings, the clutch includes a drum 10 having an internal friction band 11 suitably mounted on a drive member 12 keyed on shaft 12$^a$ concentric with said drum. In the form shown, the band 11 has an anchor block 13 at one end fitting in a transverse slot 14 formed in a bracket 15 integral with the drive member 12. The anchor block is preferably provided with front and rear faces 13$^a$ and 13$^b$ arranged to afford limited sliding movement of the anchor block within the slot 14 in a direction extending radially of the shaft axis, so as to permit the anchor block to move toward or away from the drum and automatically position itself concentrically relative thereto when the clutch is engaged.

Suitable tension means is provided tending to move the anchor block away from the drum when the clutch is idle. In the form shown said tension means comprises a spring 16 mounted on a bolt 17 secured to a bracket 18 on the inner face of the friction band and extending through a stop 19 on the drive member 12. Said spring and bolt are disposed at an angle to the anchor block so as to tend to retract said anchor block and the adjacent end of the friction band from the drum 10.

Suitable intermediate supports 20, 20 are carried by the drive member 12 in spaced relation about the friction band as shown.

The drive member 12 has a hub 12$^b$ on which a sleeve 22 is longitudinally slidable. A shifting collar 23 is grooved in the sleeve, and is operated by any suitable means such as a yoke (not shown) in the usual manner. A pair of oppositely disposed toggle links 24 and 25 are pivoted at their inner ends on the sleeve 22. The outer end of link 24 has a universal joint 26 disposed between and connected to bifurcated arms 27, 27 of a lever 28 pivoted on pin 29. The pin 29 is supported at its inner end in drive member 12, and its outer end in the bracket 15 which also supports the anchor block 13 as previously described.

Pivoted on the pin 29 between the bifurcated arms 27, 27 of the lever 28 is a bell crank lever 30 having one arm 31 extending in a generally radial direction, and another arm 32 extending in a direction tangential of the clutch drum. The arm 31 of said bell crank lever is pivotally connected directly to the free end of the friction band 11 for operating the latter, as for instance by a link 33 including a turn buckle which is provided for adjusting the operating position of said clutch band.

The free end of the friction band is also supported by a radially extending link 35 connected between the end of said friction band and a pin 36 carried by the driving member 12 at a point closely adjacent the sleeve 22 (see Fig. 3).

Yielding tension means are provided between the end of bell crank lever arm 32 and the adjacent end of bifurcated lever 28. In the form shown, said yielding tension means comprise a coil spring 40 mounted on bolt 41. The spring 40 is interposed between the head 41ª of said bolt and a cross piece 28ª connecting the bifurcated arms 27, 27 of lever 28. The bolt passes through said cross piece 28ª and has its inner end fixed to the lever arm 32 as clearly shown in Figure 1.

The opposite toggle link 25 is connected to a lever 45 through a universal joint connecting 46. The lever 45 is pivoted on pin 47 supported by the driving member 12. The opposite end of the lever 45 is connected to the adjacent end of lever 28 by an equalizing bar or link 50. Said equalizing bar is provided with a turn buckle 51 for adjusting the effective length thereof in the usual manner.

The operation of the clutch device above described will now be understood. With the shifting sleeve 22 at its innermost position as shown in full lines in Figure 2, the toggle links 24 and 25 are in substantial vertical alignment with each other so as to throw the levers 28 and 45 connected therewith to their extreme outermost positions. The movement of lever 28 tends to move the bell crank lever arm 32 inwardly therewith through the yielding connection provided by spring 40 and pin 41. This yielding connection, however, serves the important function of delaying the clutch applying force to the free end of the clutch band through the bell crank lever 30, arm 31 and link 33, and permits the friction band to adjust itself with substantially equalized frictional pressures around the entire drum. As a result, the clutch is permitted to take hold smoothly without the more abrupt grabbing action often noted where the initial clutching movement is transmitted directly and suddenly to the free end of the friction band, as in the usual construction.

At the same time, the pressure effective upon the idler link 25 is also effective upon the friction band through the medium of arm 45, equalizing bar 50, lever 28 and the yielding connection just described.

Although I have illustrated and described a certain embodiment of my invention, it will be understood that I do not wish to be limited to the exact construction shown and described, but that various changes and modifications may be made without departing from the spirit and scope of my invention.

I claim as my invention:

In a clutch, a drum, a shaft, a clutch member thereon, and friction clutch means carried thereby comprising a friction band, two levers pivoted at opposite sides of said shaft, actuating means for said levers including a sliding sleeve mounted concentric with said shaft, two oppositely disposed toggle links each interposed between said sleeve and one of said levers, an equalizing member connecting said levers for simultaneous operation, and means interposed between one of said levers and said friction band for actuating the latter, including a bell crank lever having one arm yieldingly connected to the last named lever and movable in a direction generally radial relative to said drum, and the other arm connected with said friction band to shift it circumferentially of said drum.

Signed at Lima, Ohio, this 20 day of April, 1931.

JOHN D. RAUCH.